United States Patent [19]

Swank et al.

[11] Patent Number: 5,347,367
[45] Date of Patent: Sep. 13, 1994

[54] CATHODE-RAY TUBE HAVING IMPLOSION PROTECTION MEANS WITH OPENINGS

[75] Inventors: Harry R. Swank, Lancaster; Carl L. Lundvall, II, Lititz; Raymond E. Keller, Clarks Summit, all of Pa.

[73] Assignee: Thomson Consumer Electronics, Inc., Indianapolis, Ind.

[21] Appl. No.: 55,344

[22] Filed: May 3, 1993

[51] Int. Cl.⁵ .................................... H04N 5/65
[52] U.S. Cl. ............................ 348/822; 315/8; 335/210; 348/823; 348/825
[58] Field of Search .............. 315/8, 85, 370; 358/246, 247, 248, 249; 335/210, 214

[56] References Cited
U.S. PATENT DOCUMENTS

| | | | |
|---|---|---|---|
| 4,940,920 | 7/1990 | Giannantonio | 315/8 |
| 5,036,577 | 8/1991 | Swank | 29/446 |
| 5,057,929 | 10/1991 | Hermann | 358/246 |
| 5,181,123 | 1/1993 | Swank | 358/246 |

*Primary Examiner*—Edward L. Coles, Sr.
*Assistant Examiner*—John Ning
*Attorney, Agent, or Firm*—Joseph S. Tripoli; Dennis H. Irlbeck; Vincent J. Coughlin, Jr.

[57] ABSTRACT

A cathode-ray tube comprises an evacuated envelope having a faceplate panel with a sidewall joined to a funnel. A shrinkfit implosion protection band surrounds at least a portion of the sidewall and is in contact therewith. A plurality of openings are formed in the implosion protection band to support a degaussing coil. The implosion protection band is improved over prior bands by providing a cavity in the band around at least three sides of each of the openings. The cavity is directed toward the sidewall of the panel so that the openings in the band are spaced therefrom.

5 Claims, 4 Drawing Sheets

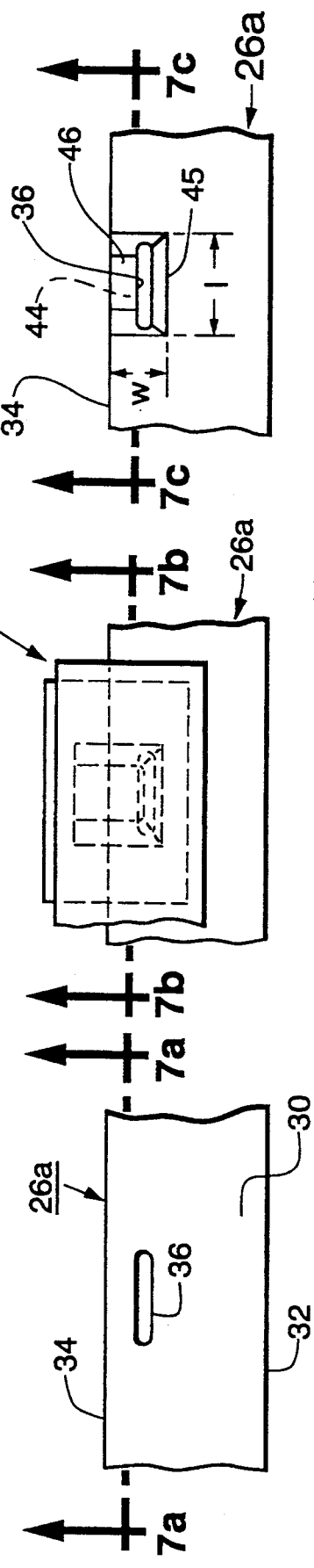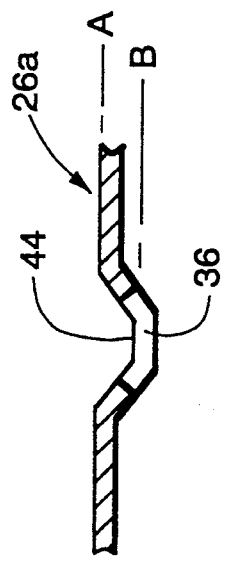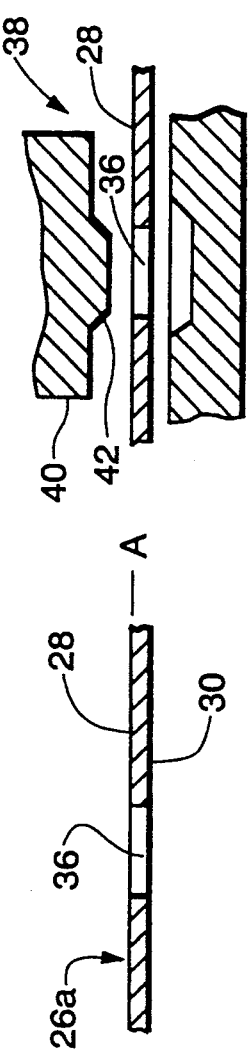

CATHODE-RAY TUBE HAVING IMPLOSION PROTECTION MEANS WITH OPENINGS

The present invention relates to a color cathode-ray tube (CRT) having an implosion protection band thereon and, more particularly, to an implosion protection band with openings formed therein to support a degaussing coil.

BACKGROUND OF THE INVENTION

A CRT is evacuated to a very low pressure and accordingly is subject to the possibility of implosion due to the stresses produced by atmospheric pressure acting on all surfaces of the CRT. This problem has been addressed in the art by providing the CRT with an implosion protection band. Such a band is used to apply a compressive force to the sidewall of a faceplate panel of the CRT to redistribute some of the forces. The redistribution of the forces decreases the probability of an implosion of the tube by minimizing tension in the corners of the panel. An implosion protection band is also beneficial because it improves the impact resistance of the tube. Glass in compression is stronger than glass which is in tension and the band causes compression in panel areas which otherwise would be in tension. The implosion protection band also provides a convenient structure on which to attach a degaussing coil that is used to remagnetize internal ferromagnetic components of the CRT.

It is known that the earth's magnetic field affects the paths of the three electron beams emitted by a CRT electron gun and may cause what is called "misregister" in a color CRT. A shadow mask having a multiplicity of apertures therethrough is located in proximity to a tricolor screen of the tube to assure that each of the three electron beams impacts the phosphor element of the proper light emitting color. Thus, for example, the electron beam which is modulated with red information impacts the phosphor element which emits red light. Because the electrons of the beams are charged particles, the earth's magnetic field has an influence on their trajectories which can cause the electrons to impact a phosphor of the improper color, causing misregister, thereby degrading the quality of the image display. For this reason, a magnetic shield, preferably an internal magnetic shield, or IMS, is used within the CRT to act in conjunction with the shadow mask and its frame to shield a substantial portion of the electron beams trajectories from the influence of the earth's magnetic field.

The shielding acts in the following way: the external magnetic field realigns the Weiss domains in the ferromagnetic material of the shadow mask, mask frame and IMS, creating an induced magnetic field that tends to oppose the action of the external field of the earth which has given rise to it. If the material of the ferromagnetic components, i.e., of the shadow mask, mask frame and the IMS, has high magnetic permeability, the induced field at least partially opposes the external field. Hence, the deleterious effect of the earth's magnetic field is reduced.

For more efficient compensation, the ferromagnetic material of the components has to be de-magnetized with a magnetic field that is provided by the degaussing coil, fixed by appropriate means to the rear of the tube and overlying the ferromagnetic components. One such arrangement is shown in FIGS. 1 and 2, in which a CRT 1 comprises a glass envelope having a faceplate panel 2 and a funnel 3 which includes a neck 4. The sidewall of the panel 2 is attached to the funnel 3 by a frit seal 5. An implosion protection band 6 surrounds the skirt of the panel 2. The band 6 has four mounting lugs 7 located at the corners of the tube to provide a means to affix the tube within a receiver (not shown). A deflection yoke 8 is attached to the funnel 3 of the tube to deflect the electron beams from an electron gun (not shown) located in the neck 4. A degaussing coil 9 having two loops 10 and 11 is fixed by appropriate means to the external surface of the tube 1. In FIGS. 1 and 2, the coil 9 is looped over the mounting lugs 7 and secured by means of a pair of holding straps 12. Alternatively, as shown in FIGS. 3–4, the coil 9 may be secured to the band 6 by means of the straps 12' or by clips 13 attached to retainers 14 adjacent to openings 15 formed in the band. The openings 15 are formed by either stamping or piercing, as is known in the art. The retainers 14 are then bent out of the plane of the band. The configuration of the coil 9 and its method of attachment to the tube depends on the tube parameters, and is adjusted to minimize misregister. As shown in the FIG. 1, the coil 9 overlies at least a portion of the implosion protection band 6.

One drawback of forming the openings 15 in the band 6 for attaching either the straps 12' or the clips 13 is that the stamping or piercing operation which forms the openings frequently causes a burr, or sharp projection, to be formed on the band 6 adjacent to the openings. Burrs are undesirable because they can either cut the insulation of the degaussing coil or injure anyone handling the tube, or if directed inwardly, toward the glass envelope of the CRT, may scratch the glass and weaken it so that it is more prone to implode if bumped or otherwise impacted. Removing the burr from the band 6 either by hand, or mechanical deburring, before installation of the band on the tube, adds additional manufacturing steps and cost to the tube manufacturing operation. Because it is nearly impossible to form the openings 15 without any burr, it is desirable to negate the effect of the burr without increasing tube cost.

SUMMARY OF THE INVENTION

A cathode-ray tube comprises an evacuated envelope having a faceplate panel with a sidewall joined to a funnel. Implosion protection means surrounds at least a portion of the sidewall and is in contact therewith. A plurality of openings are formed in the implosion protection means to support a degaussing coil. The implosion protection means is improved over prior implosion protection means by providing a cavity around at least three sides of each of the openings. The cavity is directed toward the sidewall of the panel so that the openings in the implosion protection means are spaced from the sidewall.

BRIEF DESCRIPTION OF THE DRAWINGS

FIGS. 6a, 6b and 6c show the steps in forming a band according to the present invention.

FIGS. 7a, 7b and 7c are sectional views of the forming steps of FIGS. 6a, 6b and 6c, respectively.

DETAILED DESCRIPTION OF THE PREFERRED EMBODIMENTS

Figure 1:
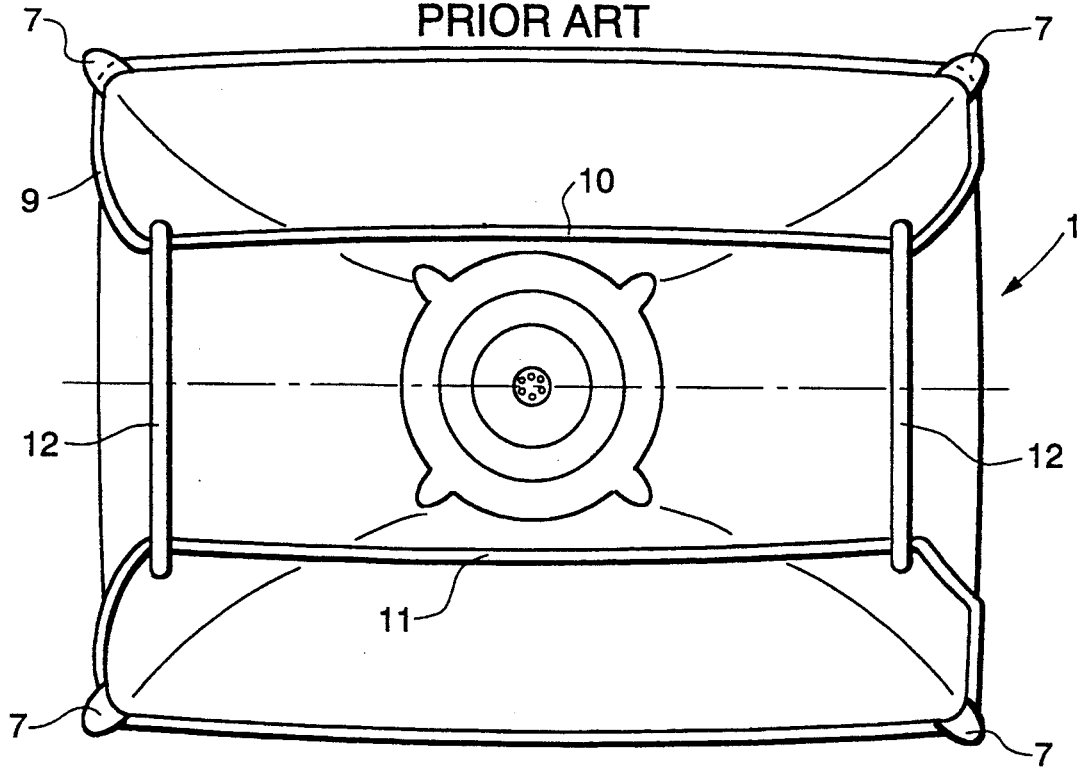
FIG. 1 is a rear view of a CRT showing a prior art implosion protection band with a degaussing coil held in position on the CRT by mounting lugs and straps.
Figure 2:
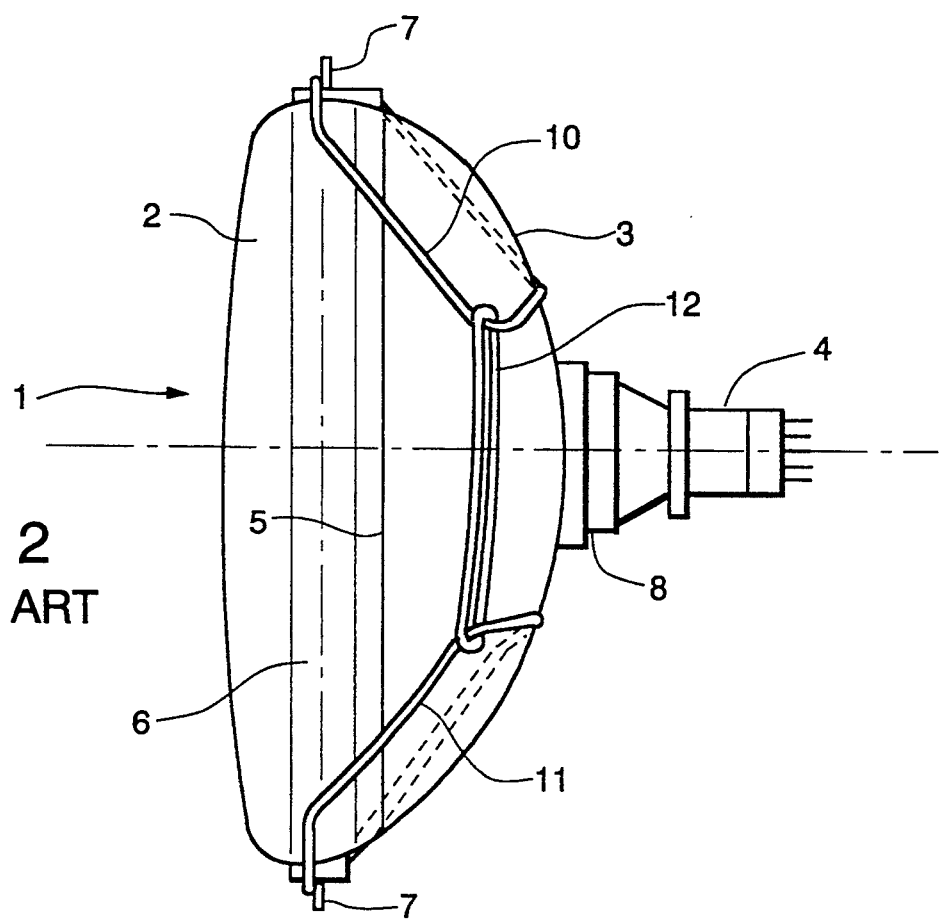
FIG. 2 is a side view of the CRT, band and coil of FIG. 1.
Figure 3:
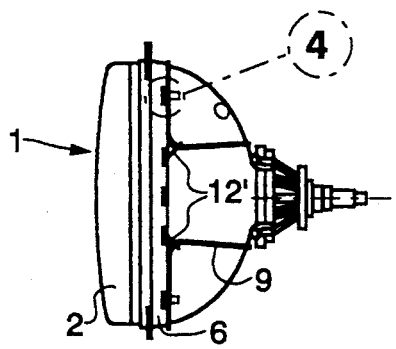
FIG. 3 shows a CRT with a degaussing coil conventionally attached to a prior art implosion protection band.
Figure 5:
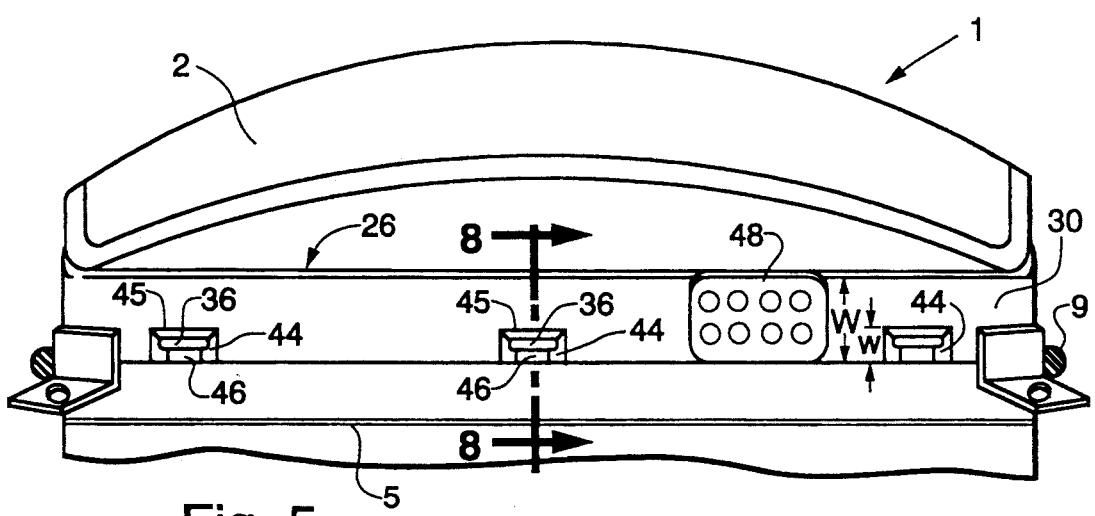
FIG. 5 shows a shrinkfit implosion protection band according to the present invention.

With reference to FIG. 5, the CRT 1 and the degaussing coil 9 are identical to those described with respect to FIGS. 1 and 2. The novel implosion protection band is a shrinkfit band 26 with cold dimensions slightly smaller than the periphery of the sidewall of the faceplate panel 2. The shrinkfit band 26 is fitted around the panel 2 by heating the band within the range of 300° to 500° C., causing it to expand, and then allowing it to cool and contact the sidewall of the panel. The tension of the cooled band 26 applies a compressive force to the panel.

As shown in FIGS. 6a and 7a, the band 26 is formed from at least one steel strip 26a which has a first surface 28, lying in a first plane A, and an oppositely disposed second surface 30. The strip has a front edge 32 and a back edge 34. The strip is pierced from the second surface 30 toward the first surface 28 at a plurality of locations, only one of which is shown, to form openings 36 adjacent to the back edge 34 of the strip. The strip is then placed in a forming die 38, shown in FIGS. 6b and 7b, with the first surface 28 of the strip directed toward a punch 40. The portion of the strip within the punch 40 contains one of the openings 36. The punch 40 has a boss 42, with sloped sides, which is designed to form a cavity 44, shown in FIGS. 6c and 7c, in the strip 26a, around at least three sides of the opening 36, by outwardly deforming, from the first plane A to a second plane B, the portion of the band contacted by the boss 42. The cavity 44 extends partially across the width, w, of the strip 26a from an interior location, hereinafter referred to as the forward edge 45 of the cavity to the back edge 34 of the strip for a distance 10 mm and has a length, 1, of about 2 mm larger than the openings 36. The retainer 46, shown in FIG. 8, comprising the portion of the strip 26a between the opening 36 and the back edge 34 of the strip, also is raised out of the first plane A and secures a clip like that shown in FIG. 4, which facilitates attaching the degaussing coil 9 to the band 26. The ends of the strip 26a are then joined together to form a connective joint 48 in the band 26 which encircles the tube 1, as shown in FIG. 5. The dimensions of the band 26 depend on the size of the tube to which it is applied. For example, for a CRT having a diagonal dimension of about 79 cm, the overall width W, of the band is about 47.5 mm. Because the cavity 44 is not in contact with the sidewall of the panel 2, the effective width, W', of the band 26, which provides the tension for implosion protection, is only that portion of the band in intimate contact with the sidewall, which in FIG. 5, is equal to W − w. The band tension, T, is a function of yield strength, Y; effective width, W'; and thickness, t, (T = Y × W' × t). An explanation of band design is contained in U.S. Pat. No. 5,181,123, assigned to the assignee of the present invention, which is incorporated by reference herein for disclosure purposes.

Figure 8:
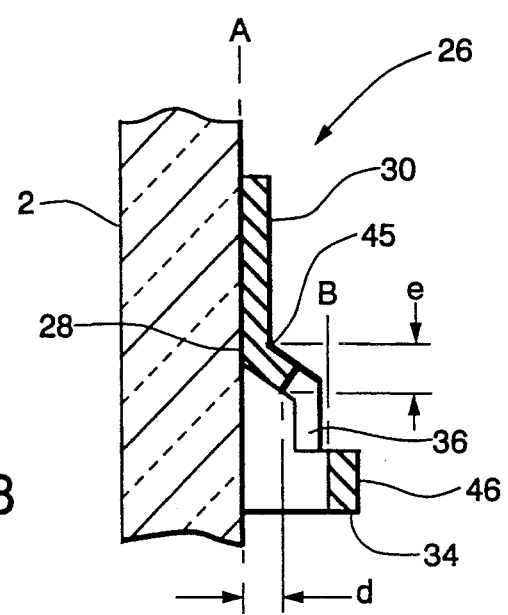
FIG. 8 shows a section of the band taken along lines 8—8 of FIG. 5.

When the shrinkfit band 26, containing the cavities 44, is disposed around the tube 1, the openings 36 are located in the outwardly deformed portion of the cavities and spaced from the sidewall of the panel 2 by a distance, d, shown in FIG. 8, of at least 0.38 to 0.50 mm (0.015–0.020 inch). The opening 36 also is spaced a distance, e, of about 0.50 to 1.25 mm from the forward edge 45 of the cavity 44. As a result, any burr (not shown) formed during piercing of the opening 36 and directed inwardly toward the first surface 28 of the band, will not pose any risk of injury to tube manufacturing personnel, nor will an inwardly directed burr contact and cut the degaussing coil 9 contacting the outer, or second surface, 30 of the band 26. Furthermore, the distance, d, of at least 0.38 mm between the surface of the glass sidewall of the panel 2 and the nearest edge of the opening 36 reduces the possibility of scratching or otherwise damaging the glass sidewall, thereby further minimizing the possibility of tube implosion due to such damage.

Figure 4:
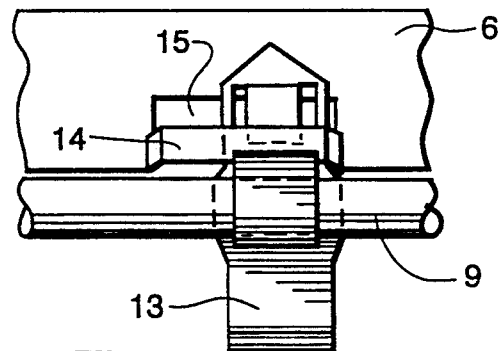
FIG. 4 shows an enlargement of the attachment means within circle 4 of FIG. 3.
Figure 9:
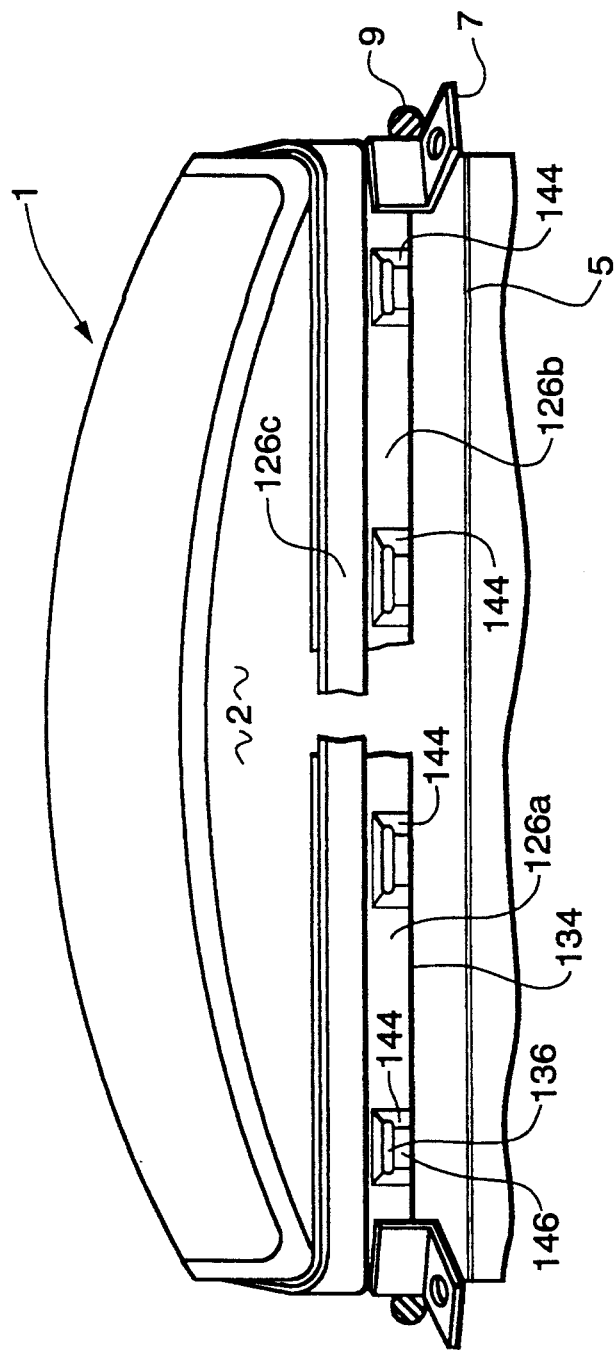
FIG. 9 shows a rim band according to the present invention with an overlying tension band which, together, form implosion protection means.

A second embodiment of the present invention is shown in FIG. 9. The tube 1 is similar to that shown in FIGS. 1 and 2, and differs only in that the implosion protection means comprises a pair of rimbands 126a and 126b and an overlying tension band 126c. Rimbands and tension bands are well known in the art. The rimbands are substantially identical half shells which are fitted around the sidewall of the faceplate panel 2 and held in position by the tension band 126c. The tension band 126c is a strap which is pulled to a desired tension and a clip (not shown) is crimped to secure the ends of the tension band. As shown in FIG. 9, each of the rimbands 126a and 126b has a plurality of cavities 144 formed therein with an opening 136 within each of the cavities. A retainer 146 separates the opening 136 from the back edge 134 of the rimband. A clip, such as clip 13, shown in FIG. 4, is disposed within each of the openings 136 and is secured by the retainer 146 to facilitate attachment of the degaussing coil 9. The cavities 144 are formed by a method similar to that described for the formation of the cavities 44 in the band 26a and differ only in that the rimbands are separate, preformed parts rather than a continuous strip of material. The cavities 144 are identical in shape and dimension to the cavities 44 formed in the shrinkfit band 26.

What is claimed is:

1. In a cathode-ray tube comprising an evacuated envelope including a faceplate panel with a sidewall having a sealing edge which is joined to a funnel, and a shrinkfit implosion protection band encircling said sidewall, said implosion protection band comprising at least one strip of metal having a first surface lying in a first plane and an oppositely disposed second surface, said first surface being in contact with said sidewall of said panel, said implosion protection band having a plurality of openings formed therethrough, said openings being spaced from an edge of said implosion protection band by a retainer which supports a degaussing coil, the improvement wherein a cavity is provided in said implosion protection band around three sides of each opening by outwardly deforming a portion of said implosion protection band from said first plane to a second plane, whereby said openings are spaced from said sidewall.

2. The cathode-ray tube as described in claim 1, wherein said implosion protection band has a front edge and a back edge, said front edge being adjacent to a viewing portion of said faceplate and said back edge being spaced from said sealing edge of said sidewall, said opening being adjacent to said back edge of said implosion protection band.

3. In a cathode-ray tube comprising an evacuated envelope including a faceplate panel with a sidewall having a sealing edge which is joined to a funnel, and a shrinkfit implosion protection band encircling said sidewall, said implosion protection band comprising at least one strip of metal having a first surface lying in a first plane and an oppositely disposed second surface, said first surface being in contact with said sidewall of said panel, said implosion protection band having a plurality of openings formed therethrough, said openings being spaced from an edge of said implosion protection band by a retainer which supports a degaussing coil, the improvement wherein a plurality of cavities being provided in said implosion protection band by outwardly deforming portions of said implosion protection band from said first plane to a second plane, each of said openings being located in one of the outwardly deformed portions of said cavities, whereby said openings are spaced from said sidewall to reduce the possibility of scratching or damaging said sidewall.

4. The cathode-ray tube as described in claim 2, wherein said openings located within said cavities are spaced about 0.38 mm from said sidewall of said panel.

5. The cathode-ray tube as described in claim 2, wherein said cavities extend partially across the width of the strip of metal forming the implosion protection band.

* * * * *